US007232136B2

(12) United States Patent
Sheehan

(10) Patent No.: US 7,232,136 B2
(45) Date of Patent: Jun. 19, 2007

(54) TRASH CART

(75) Inventor: Deirdre L. Sheehan, Northport, NY (US)

(73) Assignee: EBABE, Inc., Northport, NY (US)

(*) Notice: Subject to any disclaimer, the term of this patent is extended or adjusted under 35 U.S.C. 154(b) by 74 days.

(21) Appl. No.: 11/156,371

(22) Filed: Jun. 20, 2005

(65) Prior Publication Data

US 2006/0284391 A1 Dec. 21, 2006

(51) Int. Cl.
*B62B 3/02* (2006.01)

(52) U.S. Cl. .............................. 280/47.35; 280/47.34; 280/79.2

(58) Field of Classification Search ............. 280/47.35, 280/47.34, 47.11, 47.371, 79.2, 87.01, 79.11, 280/651, 655, 655.1
See application file for complete search history.

(56) References Cited

U.S. PATENT DOCUMENTS 3,510,055 A * 5/1970 Safford ...................... 232/43.2
3,893,615 A * 7/1975 Johnson ..................... 232/43.2
3,934,894 A * 1/1976 Hoeffken et al. ........ 280/47.19
4,199,161 A 4/1980 Nieminen et al.
4,670,227 A * 6/1987 Smith ......................... 422/297
4,821,903 A 4/1989 Hayes
4,953,744 A 9/1990 Koyama
4,988,010 A * 1/1991 Pollak ........................ 220/503
5,040,811 A 8/1991 Busken et al.
5,042,642 A 8/1991 Ulrich
5,044,644 A * 9/1991 Duran et al. ............. 280/47.35
D327,152 S * 6/1992 Rose et al. .................... D34/5
5,118,037 A * 6/1992 Ekegren .................... 232/43.1
D329,516 S * 9/1992 Bailly .......................... D34/5
5,192,092 A 3/1993 DiBenedetto
5,353,887 A 10/1994 Putnam
5,375,860 A * 12/1994 Ernsberger et al. ...... 280/47.35
5,380,033 A 1/1995 Harling
5,448,945 A * 9/1995 Taylor et al. ............... 100/100
5,551,715 A 9/1996 Pickard
5,605,344 A * 2/1997 Insalaco et al. .......... 280/47.34
5,718,168 A * 2/1998 Harrington .................. 100/226
5,730,451 A 3/1998 Walker
5,860,659 A 1/1999 Hart
5,876,047 A * 3/1999 Dennis .................... 280/47.35
5,967,355 A * 10/1999 Ragot ........................ 220/4.32
6,138,558 A * 10/2000 Harrington .................. 100/102
6,637,764 B2 10/2003 Novakowski
6,648,349 B1 * 11/2003 Waller et al. ............ 280/47.35
6,827,357 B2 * 12/2004 Calmeise et al. ........ 280/47.34
2002/0030335 A1 3/2002 Moore
2002/0109318 A1 * 8/2002 Calmeise et al. ........ 280/47.35
2005/0057011 A1 * 3/2005 Chang ...................... 280/47.35
2006/0076744 A1 * 4/2006 Martin .................... 280/47.35

* cited by examiner

*Primary Examiner*—J. Allen Shriver
(74) *Attorney, Agent, or Firm*—Law Office of Leo G. Lenna

(57) ABSTRACT

The present invention is directed to a trash cart, namely an enclosed trash cart having a top and front doors that swing open on a hinged system. The enclosed trash cart is connected to at least one wheel axle having wheels that allow the cart to be transported from a storage area to the curb for garbage pickup. The trash cart can also have an attachment system that gives the owner the option of overlaying a number of different external decorative panels to the trash cart making the cart both functional and decorative. The trash cart of the present invention enables a homeowner to store daily garbage outside the home or garage in a decorative enclosure that keeps the garbage protected from animals and makes it easy to transport garbage to the curb on pick-up day.

22 Claims, 5 Drawing Sheets

TRASH CART

FIELD OF THE INVENTION

The present invention relates to a trash storage device, and more particularly to a trash cart that stores daily trash and makes the transportation of the trash to the curb on pick-up day easier with a wheeled system. The trash cart is designed to protect the trash from animals, allow for ventilation, and to be decorative so as not to be an eyesore next the building in which it is stored. The trash cart can also be customized with decorative panels so as to match or complement the building next to which it is installed.

BACKGROUND OF THE INVENTION

Everyday life includes many chores that need to be done on a recurring basis. Home and business owner's daily storage and the task of taking out the garbage can be particularly challenging. In most areas, homeowners need to take the trashcans to the curb for pickup by the municipal or private garbage collectors at least once and most often several times a week. This can mean carrying, or rolling several individual trash cans to the front curb, which can be anywhere from ten feet away from the house to several hundred feet away from the house.

For many homeowners this task is done early in the morning, rather than the night before pickup because animals, such as raccoons, fox, deer and the like often get into the trash cans and throw trash all over the lawn while looking for food. Currently, one of the only alternatives currently available to prevent waking up to a lawn full of trash is to take the trashcans to the curb the morning of pickup. Often, taking the trashcans to the curb the morning of pickup usually means it is done when the homeowner is dressed and rushing to work.

Individual trashcans with wheels are easier to get to the curb than non-wheeled trashcans since they do not have to be carried. However, the wheeled trash cans do very little to protect the cans from being toppled and opened by animals if left outside overnight. Some trash cans use the handles from which they are pulled to lock the cover of the trashcan closed. Although a good concept, the handles are usually easily opened by determined rodents looking for their next meal and therefore are of little help.

Another problem associated with using individual trash cans is the fact that the homeowner can transport only one wheeled trash can at a time to the curb. Therefore, it is often necessary for the homeowner to make several trips to complete the task. Making several trips can be time consuming and depending on the distance and incline from the house to the curb can be exhausting. This fact alone makes the option of using individual trashcans less attractive than the trash cart of the present invention.

Between the assigned days for garbage pick up is the ongoing problem of daily garbage storage. Many people store garbage in their garage until pick up day. This often causes a space issue with cars and/or other items being stored as well as odors permeating the structure. Others opt to keep their garage outside using a multiple of solutions in order to ward off animals. This includes ropes and bungee cords attempting to secure the garbage and/or adding weighted objects to the top of the trash cans. Each time a homeowner adds trash, they must re-secure the trash can covers.

There are devices available today that are used to transport trash cans to the curb for pick up but these devices are not enclosed, leaving the trash cans/garbage exposed to animals. Since the trash cans are not protected against animals, these devices must be stored inside and therefore are only marginally better than individual wheeled trash cans and do not solve the problem of garage space.

Another problem faced by homeowners with trashcan transportation devices and trashcans available on the market today is that they are often unattractive. In stark contrast, the trash cart of the present invention has decorative panels that can be used to either match or complement the building next to which it is stored.

Finally many of the transportation carts available on the market today are made of flimsy tube piping making the overall structure un-sturdy.

Therefore in view of the foregoing shortcomings, what is needed is a trash cart that is sturdy enough to allow a homeowner to store their daily garbage, move the garbage to the curb easily and allow the homeowner to bring the cart to the curb the night before without worrying about the animals getting into the trash. Additionally, the cart is decorative so as to complement a building when stored on the side of the house or left at the curb for pickup. The present invention contains all of these attributes and more and solves the problems and shortcomings described above.

SUMMARY OF THE INVENTION

The present invention is directed to a trash cart comprising a front panel, a back panel, a right side panel, a left side panel, a top panel, and a bottom panel all of which are configured so that when they are attached they form an enclosure. The top panel of the trash cart may be configured to have at least one hinge means designed to attach one edge of the top panel of the trash cart to a second edge of the back panel. The result of this configuration is an enclosure having a hinged top panel that can be opened to expose the interior of the enclosure.

The structure may also have a front panel having at least one hinge means that is configured so as to be in direct communication with at least one door, the door being contiguous with the front panel of the trash cart when closed and exposes an interior portion of the trash cart when opened. In an alternative embodiment of the trash cart, the trash cart is configured to have two doors on a hinge means that open in opposite directions to expose the interior of the trash cart.

In still another embodiment the trash cart the trash cart is configured to have at least one wheeled axle located at the back portion of the bottom panel of the trash cart and at least one leg of the same height as the wheel is attached to the front portion of the bottom panel of the trash cart so that the trash cart is leveled. The wheeled axle makes transporting of trash cans in the trash cart easier for the user. In an alternative embodiment of the invention, a second wheeled axle is attached to the front bottom panel of the trash cart replacing the leg previously mentioned. The four-wheeled trash cart is designed to handle more weight than the single axle version.

Both the single and multiple axle version of the present invention may be equipped with a steering mechanism that will allow the user to maneuver the trash cart to the curb on pick-up day and back to the storage place once the trash is collected.

Another embodiment of the invention is directed to a trash cart kit. The trash cart kit comprises a front panel, a back panel, a left side panel, a right side panel, a top panel, and a bottom panel. Each panel having the proper holes, fasteners and bolts that can be used to assemble the individual panels together to form an enclosure. On the outside portion of the front panel, the back panel, the left side panel, the right side panel, and the top panel is an attaching means for attaching decorative panels. The kit can have several different decorative panels that can make the enclosure complement the building in which it belongs or an ornate structure such as plastic overlay design (such as basket weave) wrought iron design, stucco, wood frame, vinyl shingles, aluminum siding or the like to give it a unique look.

The top panel can be hinged to the back panel so that it can open to reveal the trashcans stored inside. In one embodiment of the trash cart the top panel of the trash cart can be split in more than one portion, preferable two portions. Each of the aforementioned portions is configured so that they can be hinged to the back panel so as to open together or independently. The front panel can be designed so as to have a single or double doors hinged so that the door(s) can be opened to reveal the trash cans stored within the enclosure.

As with the other embodiments described above, the trash cart kit may include one or two axles that can be attached to the bottom portion of the trash cart. Each axle may have at least one wheel, preferably two wheels, so as to support the trash cart and make it easy to move from one place to another. The kit may also contain illustrative instructions that describe how the described components fit together.

Figure 1:
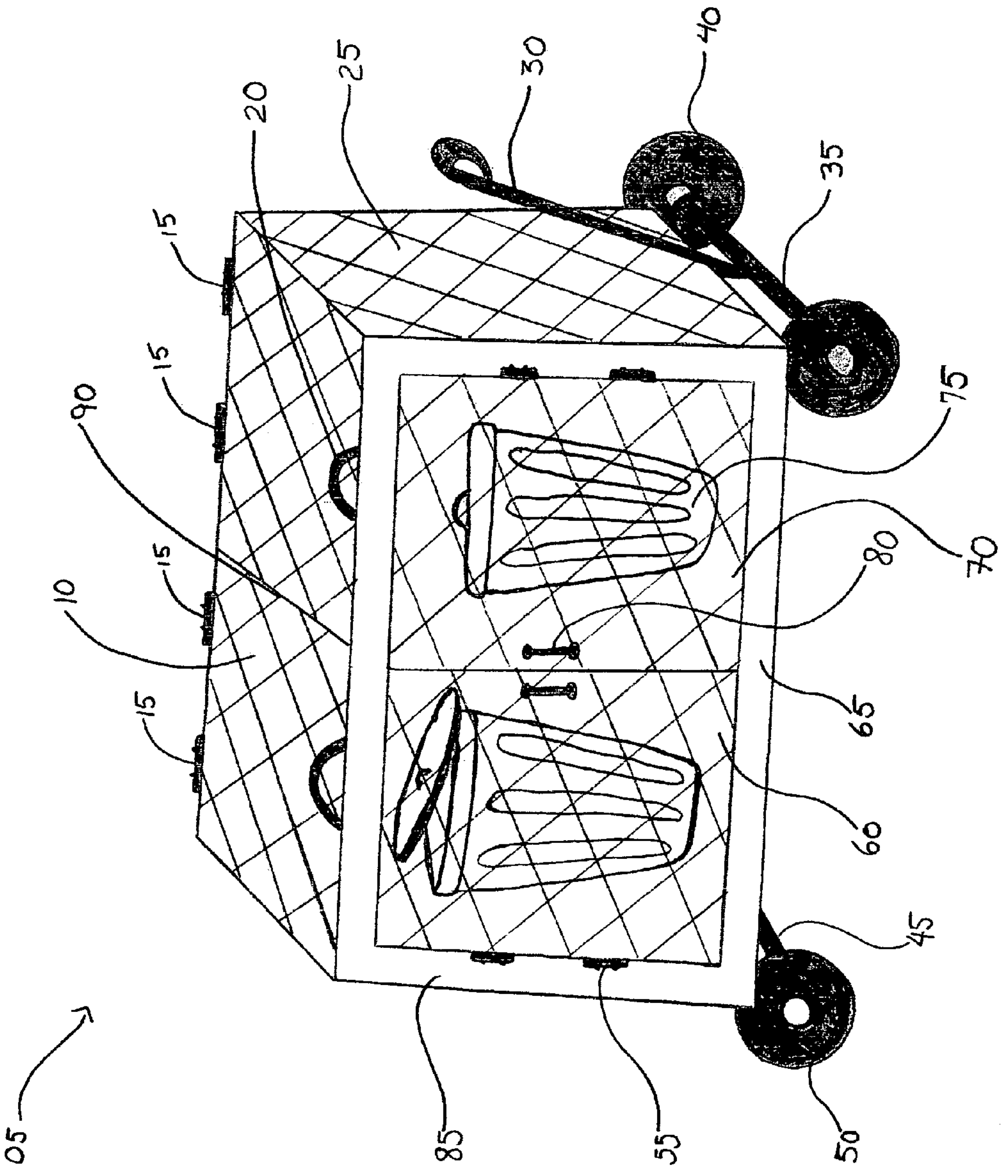
FIG. 1.

(05) a full view of the trash cart with doors and top lids closed.

(10) top panel (15) top hinges (20) top handle (25) right side panel (30) steering means (35) front axle (40) front wheel (45) rear axle (50) rear wheel (55) front door hinges (60) left front door (65) front lip (70) right front door (75) trash can (80) front door handle (85) structural front portion (90) separator panel

FIG. 2:

(100) a full view of the trash cart with doors opened.

(105) top hinges (110) top panel (115) separator panel (120) back panel (125) right side panel (130) steering means (135) right front door (140) front axle (145) front wheel (150) hooks for carrying bulky material (155) front lip (160) bottom panel (165) rear axle (170) rear wheel (175) left side panel (180) left front door (185) front support members (190) top handles

FIG. 3:

(200) is a full view of the trash cart with doors open and on and top lid open.

(205) open left top panel portion (210) left top handle (215) top panel hinges (220) closed right top panel portion (225) right side panel (230) steering means (235) open right front door (240) front axle (245) front wheel (250) back panel (255) separator (260) front lip (265) rear axle (270) wheel lock (275) rear wheel (280) left side panel (285) opened left front door (290) interior portion of trash cart (295) structural front member (300) interior space (305) light (310) deodorizer

FIG. 4:

(400) a schematic of the kit assembly.

(405) top panel (410) top panel hinges (415) separator panel (420) front panel handle (425) back panel (430) right side panel (435) left side panel (440) bottom panel (445) separator panel (450) wheel (455) axle (460) steering means (465) structural supports (470) left front door (475) right front door (480) steering connection (485) instructions (490) fasteners and bolts

FIG. 5:

(500) is a top view of a panel with attaching hooks and decorative panels.

(505) fastener for decorative panels (510) wrought iron decorative panel (515) decorative brick panel (520) decorative vinyl siding panel

DETAILED DESCRIPTION OF THE INVENTION

The present invention is directed to a decorative trash cart that is designed to provide outside storage of trashcans while preventing egress into the trashcans by animals. The trash cart of the present invention is also designed to be mobile so as to make moving the trashcans in the trash cart to the curb faster and easier than without a trash cart. These and other features are shown in FIGS. 1-5 of the present document and are further described below.

Figure 2:
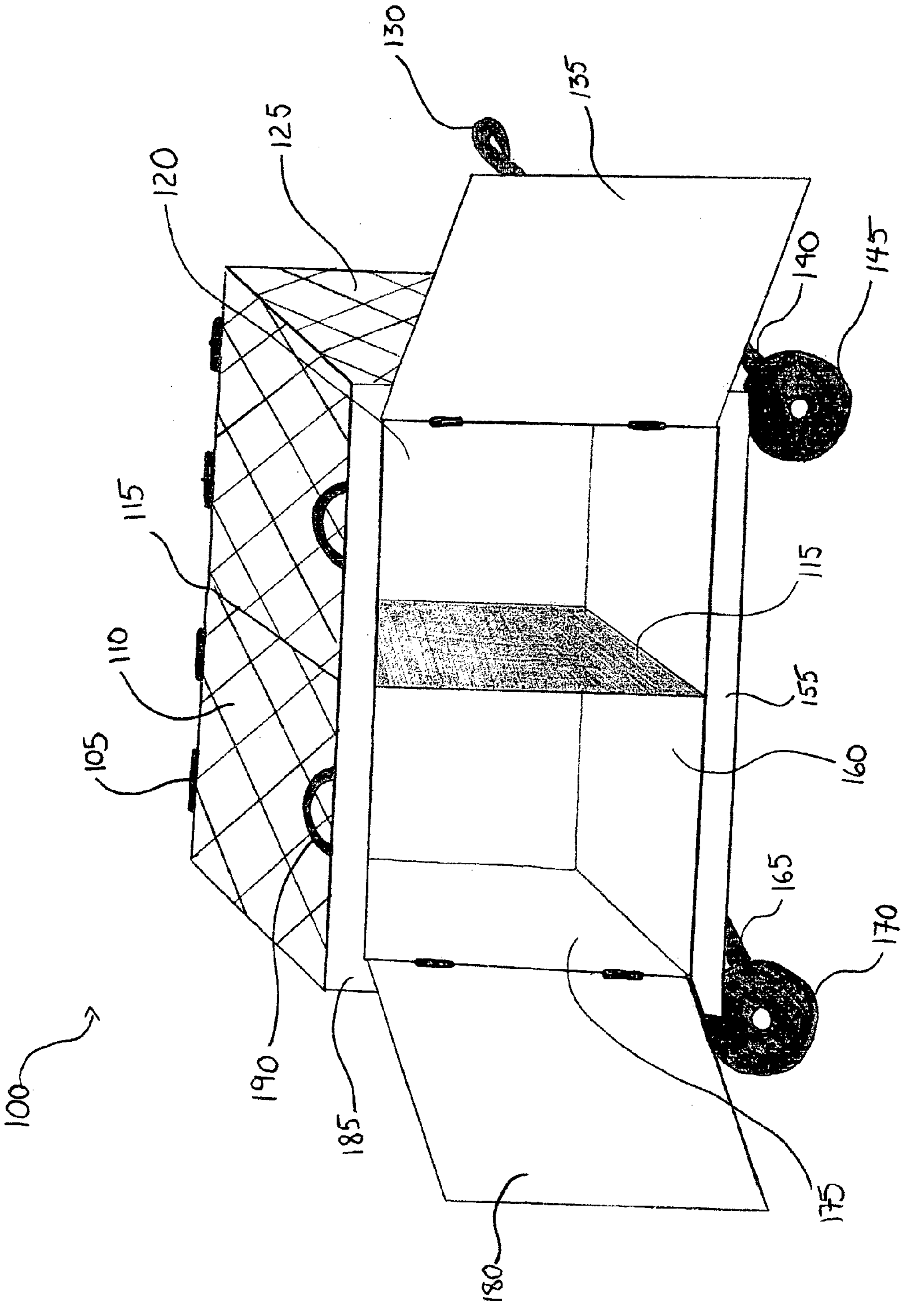

One embodiment of the trash cart of the present invention shown in FIG. 1 comprises, a top panel (05), a bottom panel (shown in FIG. 2), a right side panel (25), a left side panel (shown in FIG. 2), a front panel and a back panel (shown in FIG. 2). The panels are arranged and fastened to each other so as to create an enclosure having a top, bottom, front, back and two walls.

The top panel (10) of the trash cart (05) may be split into two portions by a separator panel (90) so that each of the two portions of the top panel (10) can be lifted independently by handles (20) revealing the top of the trash cans (75) within. The top panel (10) is connected to the back panel by multiple hinges (15) making it easy to lift the top panel portions so as to gain access to the trashcans (75). This feature can be used when trash is being placed into one of the trashcans (75) within the cart and there is no need to expose the other trashcans (75). Having the split top panel on hinges makes it easier for the user to gain access to the trashcans (75) within the cart.

When the trashcans are filled and they need to be taken out, the top panel (10) can be opened and the trashcan lifted over the front panel out of the trash cart (05). This may be done when the trashcans are light, but if this is done when the trashcans are heavy it can cause a strain on the lifters back. It can also be messy if the trashcans are over filled. For this reason and others, the front panel of the trash cart can have at least one door that when closed is flush with the rest of the front panel. In one embodiment of the invention, the front panel comprises a left front door (60) and a right front door (70) that is contiguous with the structural front portion (85) of the trash cart. The left front door (60) and the right front door (70) are connected to the structural front portion (85) by front door hinges (55) and each door can be equipped with front door handles (80) so as to make it easy for the user to open the front doors. The front doors may be locked using a latch or a keyed system.

The front panel may also have a front lip (65) that is in communication with the lower portion of the front panel. The front lip is designed to stop the trashcans (75) from falling out of the trash cart once the front doors are opened after the cart has been moved. Since the trashcans (75) may shift during movement of the trash cart, the front lip (65) is designed to prevent the trashcans (75) from accidentally falling out when opened.

In another embodiment of the invention, the trash cart (05) can be equipped with either just a rear axle (45) having at least one rear wheel (50) or a front axle (35) and a rear axle (45). The front axle (35) having at least one wheel (40) and the rear axle (45) having at least one wheel (50). In a preferred embodiment of the invention, the front axle (35) and the rear axle (45) each have two wheels. One of the two wheels is attached to each end of the axles so as to distribute the load in the trash cart. The rear axle (50) can be attached to the bottom portion of the bottom panel of the trash cart so as to be stationary. The front axle (40) on the other hand can be pivotally attached so as to provide the trash cart with some maneuverability.

In addition, the front axle (35) can be attached to a steering means (30) that when maneuvered can cause the front axle to turn in the direction that the user wants the trash cart (05) to move towards. The steering means (30) can also be used to pull the trash cart to the intended site whether it is to the curb for trash pick-up or back to the storage spot on the side of the building.

As mentioned above, the trash cart (05) can be equipped with a separator (90) and a front lip (65). These structures are designed to aid in keeping the trashcans (75) in place while the trash cart (05) is moved from one place to another. The trash cart (05) can also be equipped with locking trim that can be attached to the interior portion of the bottom panel of the enclosure that will prevent the trashcans (75) from moving during movement of the trash cart (05).

The overall construction of the panels can be made out of wood, wrought iron, aluminum, stainless steel, powder coated aluminum, plastic, polyvinyl chloride, powder coated steel, plastic coated metal, man-made materials, new-age materials, or any other material that is washable, and strong and durable enough for the intended use of the trash cart. The trash cart should be designed so as to have enough holes in the structure so as to allow amble ventilation so as to prevent spontaneous combustion of the trash. The holes are also needed to allow rain water and water used to clean the trash cart to run out of the structure so as to prevent pooling of excess water.

FIG. 2 shows the trash cart of the present invention with the front doors in the open position. The trash cart (100) comprises a top panel (110), a bottom panel (160), a right side panel (125), a left side panel (175), and a back panel (120). As in FIG. 1, the above panels are arranged and fastened to each other so as to create an enclosure having a top, bottom, front, back and two walls. A separator (115) divides the interior space into two separate portions so as to keep the two trashcans separate. Although FIGS. 1 and 2 are shown having two doors, two top panels, one separator creating two compartments, it is well within the scope of the invention to have additional doors and compartments.

The right front door (135) and left front door (180) can be opened so as to be flat against the structural front portion (185) of the front panel. Using special hinges, the front doors can be made to wrap around the structural front portion (185) of the front panel so as to remain flat against the left side panel (175) and the right side panel (125) when in the opened position. Once in this position, the doors can be latched back so as to not swing close unexpectedly. This feature is extremely helpful when the user is power washing the interior of the trash cart or when the trashcans are being removed from the trash cart and the cart is on unleveled ground.

As in FIG. 1, the top panel (110) of the trash cart (100) may be split into two portions by a separator panel (115) so that each of the two portions of the top panel (110) can be lifted independently by handles (190) revealing the interior portion of the trash cart (100). The top panel (110) is connected to the back panel by multiple hinges (105).

As shown in FIG. 2, the trash cart (100) is equipped with a rear axle (165) having wheels (170) attached to each end of the rear axle (165) and a front axle (140) having wheels (145) attached to each end of the front axle (140). The rear axle (165) is fixed to the bottom portion of the bottom panel (160) and the front axle (140) is pivotally attached to a different portion of bottom panel so that the axle can shift from side to side so as to steer the trash cart.

The front axle (140) is attached to steering means (130) that when maneuvered causes the front axle and it's attached wheels to turn in the direction that the user wants the trash cart (100) to move towards. As stated above in FIG. 1, the steering means (130) can also be used to pull the trash cart to the intended site. The wheels of the front and/or back wheels can be equipped with a locking mechanism to prevent the trash cart from rolling if left on un even ground. The trash cart can also be equipped with a hook system (150) (not shown) that can be attached to the side and or back of the trash cart that can be used to carry bulky items such as an old latter, old doors, and the like to the curb on pick-up day.

Figure 3:
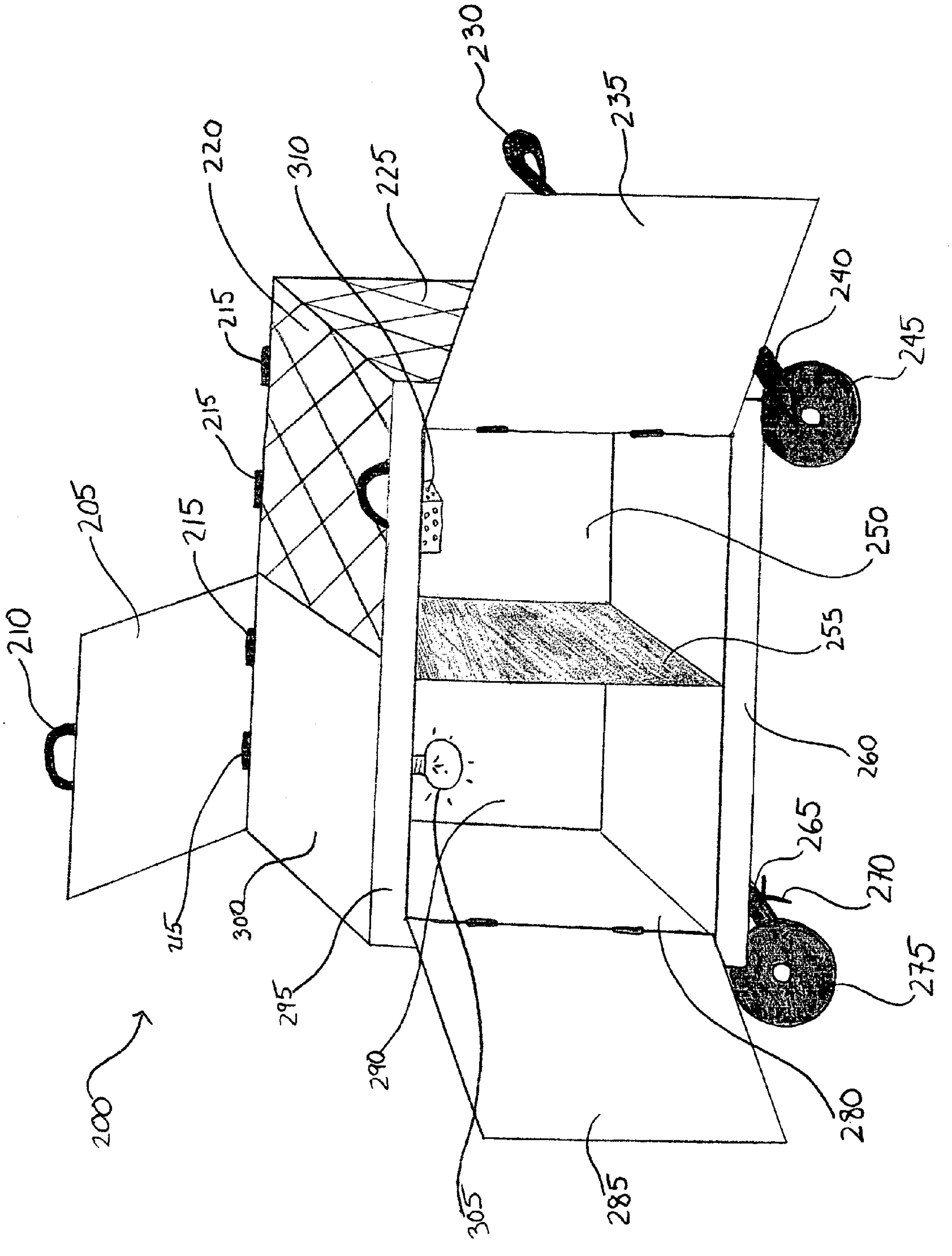

FIG. 3 shows another view of the present invention wherein the front doors are in the open position and one of the top panel portions is in the lifted position. All of the components of the trash cart of FIG. 2 are also in the embodiment shown in FIG. 3. The embodiment shown in FIG. 3 shows a locking mechanism (270) on the rear axle that is designed to lock the wheels in placed so as to prevent the trash cart from rolling if left on un-even ground. This same mechanism can be attached to the front axle instead of the rear axle or on both the front and rear axle of the trash cart. It is within the scope of the invention to use the locking wheel mechanism in all of the embodiments described herein.

Figure 4:
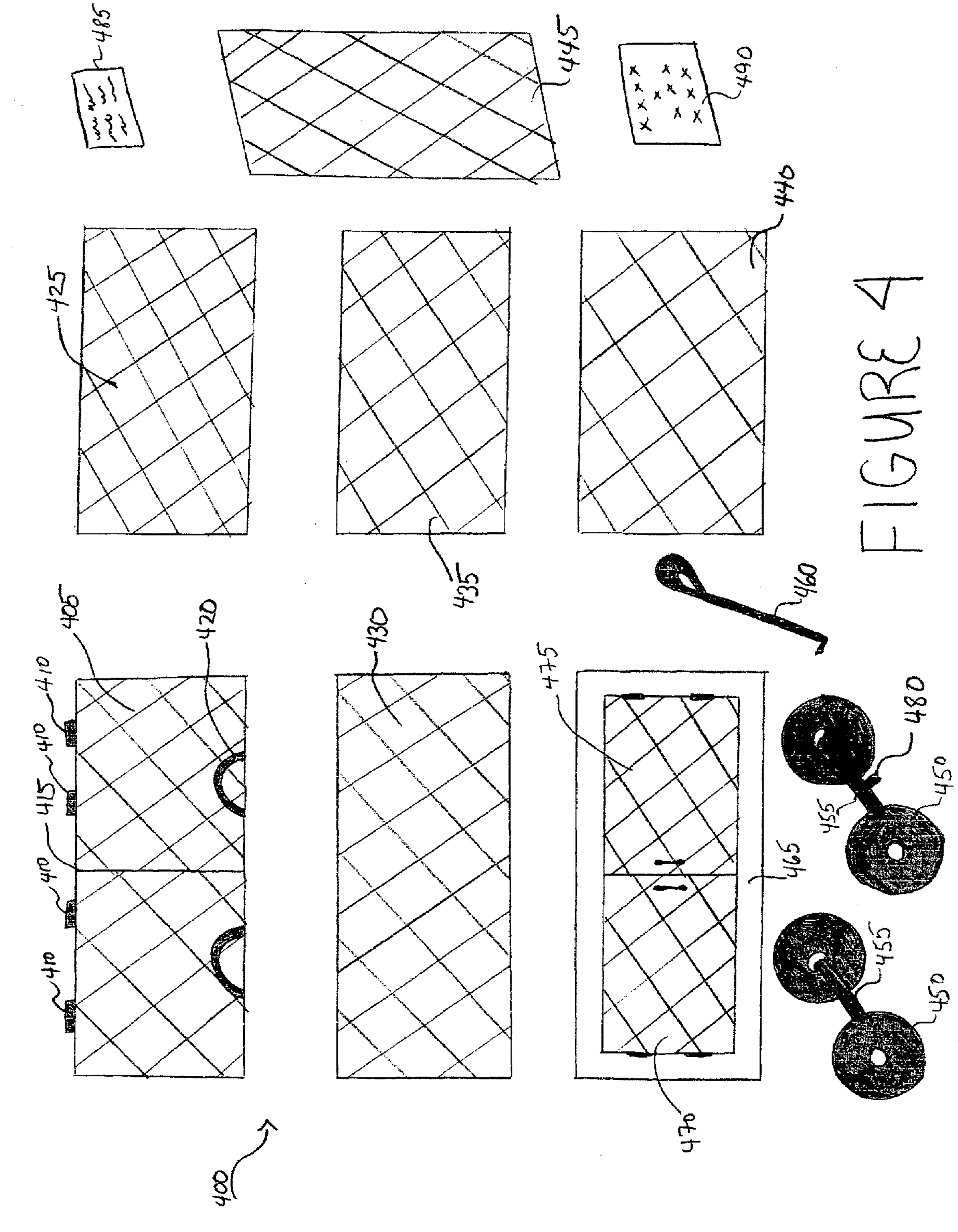

Still another embodiment of the invention is directed to a trash cart kit comprising a top panel (405), top panel hinges (410), separator panel (415), front panel handle (420), back panel (425), right side panel (430), left side panel (435), bottom panel (440), separator panel (445), wheels (450), axles (455), steering means (460), structural supports (465), left front door panel (470) right front door panel (485), steering connection (480), instructions to assemble the trash cart (485), and various fasteners, bolts and pins necessary to connect all of the parts together. The trash cart kit is shown in FIG. 4 and is designed to be easily assembled. The trash cart kit is easier to ship, store, and package, all of which results in savings that can be passed on to the consumer. In addition, compact packaging also allows the consumer to transport the trash cart from the store to home without a truck.

The trash cart, once assembled, has all of the features, attributes and benefits of the fully assembled versions shown in FIGS. 1-3. The trash cart kit can also includes special fasteners that allow the owner to decorate the trash cart so as to be pleasing to the eye, match the structure in which is stored next to or to just to personalize the cart. For example, the kit can include special fasteners and a printable plate that can be engraved and/or printed with the name and/or address of the owner.

In still another embodiment of the invention, the panels can be almost completely solid having only a few holes for water drainage and/or ventilation. The fasteners can be attached to the top panels (405), back panel (425), right side panel (430), left side panel (435), bottom panel, left front door panel (470) and right front door panel allowing for decorative panels to be attached. The decorative panels can be made out of material selected from the group consisting essentially of wood, wrought iron, aluminum, stainless steel, powder coated aluminum, plastic, polyvinyl chloride, powder coated steel, plastic coated metal, man-made materials, new-age materials, or any other material that is washable, strong enough and durable enough for trash cart wear. Custom panels can be made so as to match any structure or to make any trash cart unique.

Another feature that can be added to the trash cart is an internal light that turns on automatically using a light sensor when either the top panel or front doors are opened. This light can be powered by solar or energy from a battery. The same solar charge/battery pack can be used to power an odor control unit that emits a scent to mask the smell of the trash either on a timer or using a malodorous detector that activates the fragrance emitter when odors reach a certain detectable level. All of these features are known in the art but are unique when incorporated into the present invention.

Figure 5:
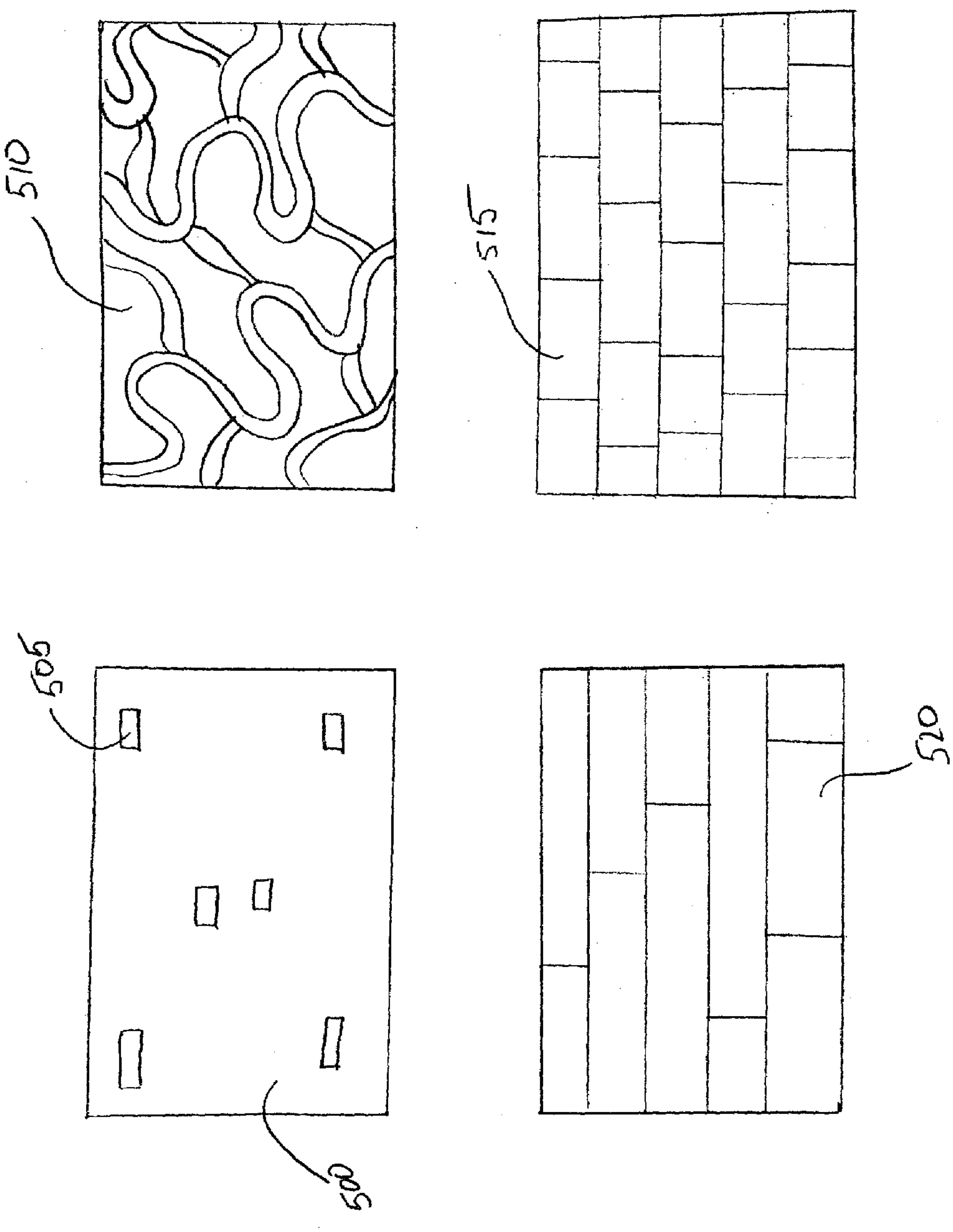

FIG. 5 gives several examples of decorative panels. These are only examples and many other designs can be used and are anticipated to fall with the scope of the invention. These panels should be weather resistant; however, making the trash cart from a virtually indestructible material will allow the cart to last while changing the decorative panels on the outside would allow the trash cart to look new even though the internal structure is old. This is a direct savings to the consumer and opens up an additional market for decorative panels.

The above embodiments of the present invention can be manufactured using well-established manufacturing techniques used in similar industries today. The technique used to make the present invention is directly related to the material used to make the trash cart. For example, if plastic is used to make the trash cart then the well-established technique of cast molding maybe used. If metals are used to make the trash cart, then welding and/or drop forging of metals maybe used to make the trash cart. And finally, if wood is used to make the present invention then standard wood milling and carpentry techniques can be used. The aforementioned list is not meant to be an exhaustive list designed to cover all of the possible techniques that can be used to make the invention but are only offered as examples. One skilled in the art would manufacture the trash cart using techniques available at the time the trash cart is manufactured.

The materials used to make the present invention should be durable enough to withstand the abuse often associated with trash cans but must be light enough so that the trash cart can be moved easily and without undue effort just to carry the weight of the trash cart.

In another embodiment of the invention, the trash cart is equipped with a motor that is in direct communication with at least one wheel and/or axle of the trash cart that when powered would rotate the wheel and/or axle so as to move the trash cart in the forward or reverse direction. The motor can be powered by gas, electric or some combination of each and can be controlled by either a remote control device or a direct control device.

So as not to allow egress of small animals into the main compartment of the trash cart, the panels should have predominantly solid construction having only strategic holes for ventilation and water drainage. The enclosure should also be designed to keep most of the rainwater from getting into the structure. To achieve this task the structure is designed to have a slanted roof so as allow rain to run off of the top panel and avoid pooling of excess water. Although the main compartment of the trash cart is predominately solid construction the homeowner is able to achieve a more airy look using the decorative overlay panels. In other words, the overlay panels, once attached, would allow the home owner to achieve the wrought iron look that by definition has large spaces between each segment—spaces too large to be able to keep animals from getting into the trash cart—while still protecting the trash from animals.

As with most things in life, the trash cart of the present invention would be able to marketed as a standard model containing the basic structure to the deluxe model comprising the basic model plus the add-on features such as decorative overlay panels, outside lighting, odor diffuser, motor with remote control as well as other added features that complement the basic features of the invention. The trash cart can be designed to fit one or more trash cans, preferably two trash cans.

In summary, the present invention is directed to a trash cart that is mobile, easy to get trash cans in and out of, protects the trash cans from animal destruction, is durable, decorative and allows the user to store and transport the trash cans to the curb for collection quickly and without getting soiled.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice.

What is claimed is:

1. A trash cart comprising:

a front panel, a back panel, a left side panel, a right side panel, a top panel, and a bottom panel in communication to form an enclosure;

at least one hinge attaching said top panel to said back panel so that said top panel moves freely away from said back panel to reveal an interior portion of said trash cart, a wheel base having at least one axle connected to said bottom panel of said trash cart, said axle having at least one wheel arranged so that said trash cart moves freely on said wheel base;

a plurality of decorative panels configured so as to be attachable to said front panel, said back panel, said left side panel, said right side panel, and said top panel of said trash cart; and wherein each of said front panel, said back panel, said left side panel, said right side panel, and said top panel of said trash cart is configured to have a sleeve so that said decorative panels can be slide into said sleeve so as to display said decorative panels.

2. The trash cart according to claim 1 further comprising at least one door cut from said front panel of said trash cart, said at least one door being attached to a remaining portion of said front panel by at least one hinge whereby said door moves freely away from said remaining portion of said front panel to reveal an interior portion of said trash cart.

3. The trash cart according to claim 2 wherein said at least one door is attached to one of the structures selected from the group consisting of said left side panel, said right side panel, said bottom panel, and said top panel by at least one hinge whereby said at least one door moves freely away from the structure it is attached so as to reveal an interior portion of said trash cart.

4. The trash cart according to claim 2 wherein said trash cart comprises a first door attached to said right side panel by at least one hinge so that said door moves freely away from said right side panel to reveal an interior portion of said trash cart and a second door attached to said left side panel by at least one hinge so that said door moves freely away from said left side panel to reveal an interior portion of said trash cart.

5. The trash cart according to claim 1 wherein said top panel is permanently attached to at least one panel selected from the group consisting of said front panel, said back panel, said left side panel, and said right side panel; and said top panel comprises at least one door cut from said top panel of said trash cart, said front panel of said trash cart having at least one door and a remaining portion of said front panel contiguous with said at least one door, said at least one door being attached to the remaining portion of said front panel by at least one hinge whereby said door moves freely away from said remaining portion of said front panel to reveal an interior portion of said trash cart.

6. The trash cart according to claim 1 further comprising a steering means for steering said trash cart, said steering means in direct communication with said wheel base so that turning said steering means turns said wheel base.

7. The trash cart according to claim 1 wherein said wheel base comprises four wheels, said four wheels being independently attached to said wheel base.

8. The trash cart according to claim 1 wherein said wheel base comprises two wheel and axle configurations, each wheel and axle configuration having at least one wheel attached to opposite ends of each axle.

9. The trash cart according to claim 1 further comprising at least one separator panel attached to the interior portion of said trash cart whereby dividing the interior portion of said trash cart into multiple compartments.

10. The trash cart according to claim 1 further comprising a light.

11. The trash cart according to claim 10 further comprising a deodorizing unit.

12. The trash cart according to claim 1 further comprising fasteners configured to connect said decorative panels to said front panel, said back panel, said left side panel, said right side panel, and said top panel of said trash cart.

13. The trash cart according to claim 1 wherein said decorative panels are constructed out of material selected from the group consisting of wrought iron, stucco, wood frame, shingles, aluminum siding, polyvinylchloride (PVC), imitation brick, imitation cedar shingles, and vinyl siding.

14. The trash cart according to claim 1 wherein the decorative panels further comprise an attachment means to attach to said decorative panels to said front panel, said back panel, said left side panel, said right side panel, and said top panel of said trash cart.

15. A trash cart kit comprising:

a front panel, a back panel, a left side panel and a right side panel, a top panel, and a bottom panel;

at least one hinge means for attaching said back panel and said top panel and at least one hinge means for attaching at least one door to said front panel so that when said at least one door is opened an interior portion of said trash cart is exposed;

a wheelbase having at least two wheels attachable to said bottom panel of said trash cart so that said trash cart moves with said wheelbase;

attachable decorative panels that are configured so as to be attachable to said front panel, said back panel, said left side panel, said right side panel, and said top panel of said trash cart;

fasteners to connect said front panel, said back panel, said left side panel, said right side panel, and said top panel of said trash cart together and said decorative panels to said front panel, said back panel, said left side panel, said right side panel, and said top panel; and wherein each of said front panel, said back panel, said left side panel, said right side panel, and said top panel of said trash cart is configured to have a sleeve so that said decorative panels can be slide into said sleeve so as to display said decorative panels.

16. The trash cart according to claim 15 further comprising instructions to assemble said trash cart.

17. The trash cart according to claim 15 wherein the decorative panels are constructed of materials selected from the group consisting of wrought iron, aluminum, stainless steel, powder coated aluminum, plastic, polyvinyl chloride, powder coated steel, plastic coated metal, man-made materials, new-age materials, stucco, wood, shingles, aluminum siding, imitation brick, brick, imitation cedar shingles, and vinyl siding.

18. The trash cart according to claim 15 further comprising at least one separator panel that attaches to the interior portion of said trash cart whereby dividing the interior portion of said trash cart into multiple compartments.

19. The trash cart according to claim 15 further comprising a steering handle in communication with said wheelbase so that turning said steering handle turns said wheelbase.

20. The trash cart according to claim 15 further comprising a front lip located at a lower portion of the front panel whereby preventing trashcans from falling out of said trash cart if said at least one door is opened.

21. The trash cart according to claim 15 wherein the decorative panels are constructed out of material selected from the group consisting of wrought iron, stucco, wood frame, shingles, aluminum siding, polyvinylchloride, imitation brick, imitation cedar shingles, and vinyl siding.

22. The trash cart kit according to claim 15 further comprising a name/address plate.

* * * * *